Dec. 10, 1940.　　J. H. BRENNAN　　2,224,536
PRODUCTION OF METALS
Filed April 27, 1939
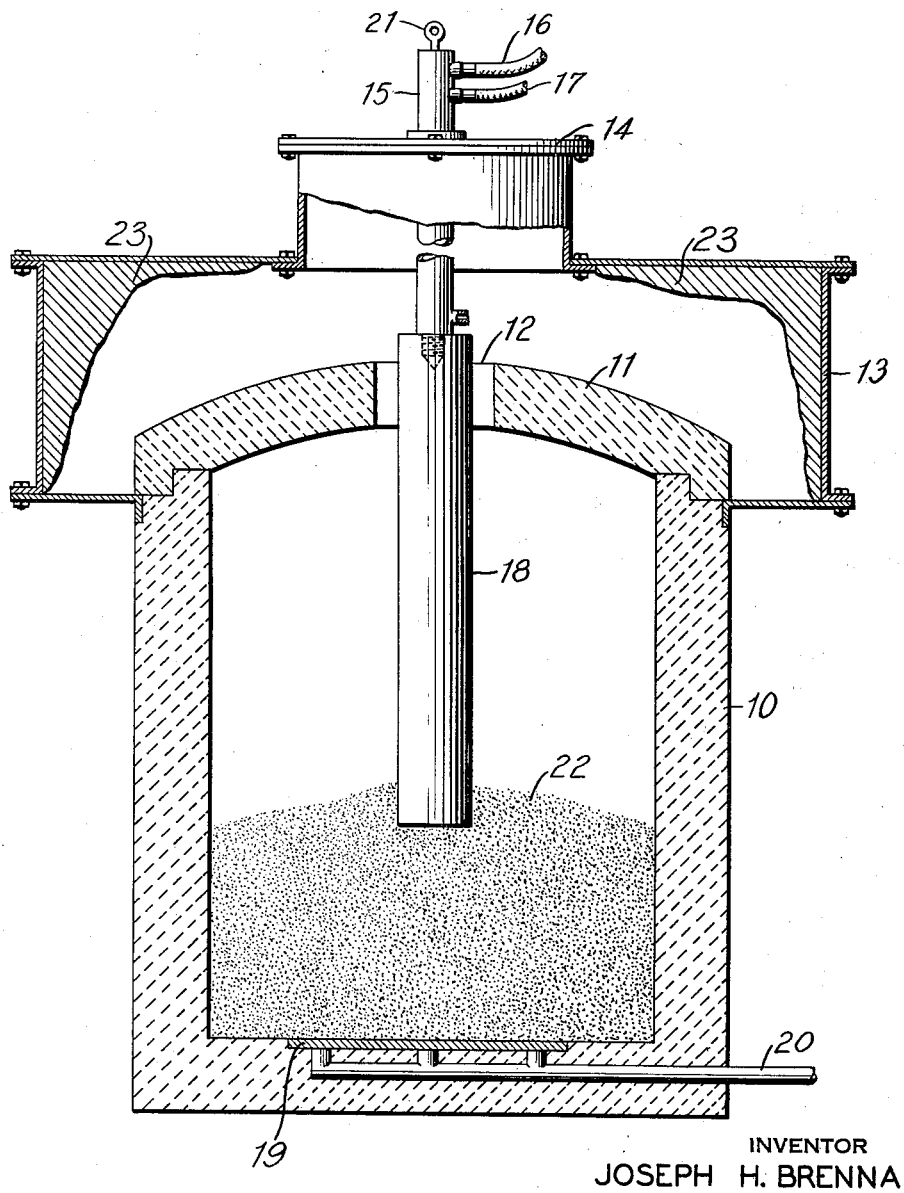
INVENTOR
JOSEPH H. BRENNAN
BY
ATTORNEY Patented Dec. 10, 1940

2,224,536

UNITED STATES PATENT OFFICE 2,224,536

PRODUCTION OF METALS

Joseph H. Brennan, Niagara Falls, N. Y., assignor to Electro Metallurgical Company, a corporation of West Virginia Application April 27, 1939, Serial No. 270,299

9 Claims. (Cl. 75—67)

The invention relates to the production of metals from their compounds and refers more specifically to the production of the alkaline earth metals calcium, barium, and strontium. For the sake of conciseness, the invention will be described with particular reference to the production of calcium, although it is not limited to the preparation of that metal.

Thermal reduction methods have previously been proposed for the preparation of metallic calcium, but the proposed methods have relied on the use of relatively expensive manufactured compounds of calcium as a source of the metal. For example, the reduction of calcium carbide with silicon or silicon alloys has been suggested; but no successful and economical method has been suggested for making calcium metal from its cheaper, readily available compounds, such as lime.

It is a principal object of this invention to provide a method of preparing any of the alkaline earth metals (calcium, barium, strontium) or mixtures of two or more of such metals, by thermal reduction of the respective oxide. Another important object is a method of preparing calcium from lime by a thermal reduction process.

These and other objects are achieved by the invention which is based on my discovery that an alkaline earth metal may be produced by heating to a reaction temperature the corresponding alkaline earth with silicon in the presence of a metal which serves to inhibit the production or persistence of silicides of such alkaline earth metal and does not dissolve or react with the alkaline earth metal. For example, the reaction products of lime with silicon are calcium silicide and silica; but when the reaction is conducted in the presence of molten iron, elemental calcium is obtained.

The silicon used as the reducing agent may be any form of elemental silicon, such as silicon "metal," a silicide, or a silicon alloy such as ferrosilicon. The use of ferrosilicon is preferred since its iron content is sufficient to prevent the formation of silicide, and no further iron need be added. When silicon metal or a silicide is used, it is necessary to add iron or other metal as previously explained.

In the accompanying drawing, the sole figure shows in diagrammatic cross-section a furnace suitable for use in the practice of the invention.

In a preferred method of preparing calcium in accordance with the principles of the invention, finely ground lime is intimately mixed with finely ground ferrosilicon. An amount of lime in excess of that theoretically required is preferably used for the purpose of forming a fluid calcium silicate slag. The mixture of lime and ferrosilicon is charged into a suitable furnace (such as an electric arc furnace) in which a partial vacuum may be maintained. The mixture is heated to reaction temperature either in vacuum or at subatmospheric pressure in an inert gas such as argon or helium. As the reaction proceeds, calcium is liberated as vapor. A fluid calcium silicate slag is formed and may be tapped from the furnace. The calcium vapor may be removed and condensed on any cool surface not reactive to calcium, and the condensate then removed.

In a typical experiment embodying the method of the invention, a mixture of 35 pounds of lime ground to pass an 8 mesh screen (2.36 mm. openings) and 10 pounds of ferrosilicon containing about 75% silicon and ground to pass a 20 mesh screen (0.83 mm. openings) was charged into an electric arc furnace. The furnace was then evacuated, and argon was admitted. The charge was heated by turning on the electric arc, and the reaction commenced almost immediately. Calcium vapor was produced by the reaction, and was condensed and recovered as substantially pure calcium. A fluid slag which was formed was tapped from the furnace at the end of the experiment. Throughout the experiment, an argon atmosphere was maintained in the furnace under a pressure of about 2 to 9 millimeters of mercury. A temperature of about 1500° C. was maintained, and the experiment was completed in about two hours. An open arc was used.

No special furnace is required for the operation, any furnace capable of maintaining the desired temperature and of operating under vacuum being suitable. In the single figure of the drawing, one type of furnace which may be used is shown in diagrammatic cross-section. The furnace comprises a crucible 10 composed of or provided with a lining of bauxite or other material resistant to calcium. The crucible 10 is provided with a roof 11, having an opening 12 therein for the escape of calcium vapor. Mounted above and supported by the crucible 10 is a condensing chamber 13 sealed by a cover plate 14 through which extends a tube 15 provided with a vacuum connection 16 and an inert gas inlet 17. A single electrode 18 is fixed to the end of the tube 15. Suitable electrical connection is made by means of a conductive insert 19 in the bottom of the crucible 10 to which a power lead 20 is connected. A second power lead 21 is connected to the hollow tube 15 extending through the cover plate 14. The crucible 10 is charged with a mixture 22 of lime and ferrosilicon. During operation, calcium vapor is produced and passes upwardly through the opening 12 in the roof 11. The vapor is condensed on the walls of the condensing chamber 13 forming a deposit 23 of substantially pure metallic calcium.

As explained above, the method of the invention may be suitably employed in the preparation of calcium, barium, and strontium. Further, it is possible to use compounds of such metals convertible to their respective oxides on heating. For example, limestone or slaked lime may be used in the preparation of calcium, such compounds being converted to lime merely by heating. Other changes and modifications may be made in the process described within the scope of the invention. For example, a reducing agent other than ferrosilicon may be used in admixture with iron or other metal which does not dissolve or react with calcium and which serves to inhibit the formation of calcium silicide.

I claim:

1. Process of preparing a metal of the alkaline earth group consisting of calcium, barium, and strontium which comprises thermally reacting an oxide of a metal of such group with silicon in the presence of a substantial proportion of iron, effective to inhibit the production of silicides of such alkaline earth metal, the iron being in a proportion substantially greater than 10% of the total amount of silicon and iron.

2. Process of preparing a metal of the alkaline earth group consisting of calcium, barium, and strontium which comprises heating an oxide of a metal of such group with ferrosilicon, containing at least about 25% iron, to reaction temperature.

3. Process of preparing metallic calcium which comprises heating lime and ferrosilicon containing substantially more than 10% iron to a reaction temperature.

4. Process of preparing a metal of the alkaline earth group consisting of calcium, barium, and strontium which comprises heating to reaction temperature an oxide of such metal and silicon, in the presence of a substantial proportion of iron, effective to prevent the production of a silicide of such alkaline earth metal, the iron being in a proportion substantially greater than 10% of the total amount of silicon and iron, such heating being effected in a partial vacuum thereby producing such metal in the form of a vapor, and removing and condensing the vapor.

5. Process of preparing calcium which comprises heating lime with ferrosilicon, containing at least about 25% iron, to a reaction temperature in a partial vacuum, thereby forming calcium vapor, and removing and condensing the vapor.

6. Process of preparing a metal of the alkaline earth group consisting of calcium, barium, and strontium which comprises heating in an inert atmosphere an oxide of such metal to a reaction temperature with silicon and a substantial proportion of iron, effective to prevent the production of a silicide of such alkaline earth metal, the iron being in a proportion substantially greater than 10% of the total amount of silicon and iron, thereby producing such alkaline earth metal in the form of a vapor, and removing and condensing the vapor.

7. Process of preparing calcium which comprises heating lime with ferrosilicon, containing at least about 25% iron, to a reaction temperature in an inert atmosphere, thereby forming calcium vapor, and removing and condensing the vapor.

8. Process of preparing calcium which comprises heating lime with ferrosilicon, containing at least about 25% iron, to a reaction temperature in an atmosphere of argon at subatmospheric pressure, thereby forming calcium vapor, and condensing the vapor.

9. Process of preparing a metal of the group consisting of calcium, barium, and strontium which comprises thermally reacting an oxide of a metal of such group with silicon in the presence of iron, the proportion of iron used being in the neighborhood of one-third the proportion of silicon.

JOSEPH H. BRENNAN.